United States Patent
Barnaby et al.

[19]

[11] Patent Number: 6,052,756
[45] Date of Patent: Apr. 18, 2000

[54] MEMORY PAGE MANAGEMENT

[75] Inventors: Michael J. Barnaby; Abe Mammen, both of Marlborough, Mass.

[73] Assignee: Oki Electric Industry Co., Ltd., Tokyo, Japan

[21] Appl. No.: 09/012,242

[22] Filed: Jan. 23, 1998

[51] Int. Cl.[7] .................................................. G06F 12/00
[52] U.S. Cl. ........................................ 711/105; 711/169
[58] Field of Search .................................... 711/154, 158, 711/169, 167, 105; 365/193, 238.5

[56] References Cited

U.S. PATENT DOCUMENTS

| | | | |
|---|---|---|---|
| 4,933,910 | 6/1990 | Olson et al. ............................. | 711/137 |
| 5,034,917 | 7/1991 | Bland et al. ............................. | 711/167 |
| 5,159,676 | 10/1992 | Wicklund et al. ...................... | 711/107 |
| 5,301,299 | 4/1994 | Pawlowski et al. ........................ | 711/5 |
| 5,303,364 | 4/1994 | Mayer et al. ............................ | 711/140 |
| 5,335,336 | 8/1994 | Kametani ................................ | 711/106 |
| 5,357,606 | 10/1994 | Adams .................................... | 345/517 |
| 5,371,870 | 12/1994 | Goodwin et al. .......................... | 710/52 |
| 5,388,247 | 2/1995 | Goodwin et al. ....................... | 711/143 |
| 5,440,713 | 8/1995 | Lin et al. ................................. | 711/158 |
| 5,461,718 | 10/1995 | Tatosian et al. ........................ | 711/206 |
| 5,479,635 | 12/1995 | Kametani .................................... | 711/5 |
| 5,485,589 | 1/1996 | Kocis et al. ............................. | 711/213 |
| 5,493,666 | 2/1996 | Fitch ....................................... | 711/118 |
| 5,572,692 | 11/1996 | Murdoch et al. ........................... | 711/5 |
| 5,586,294 | 12/1996 | Goodwin et al. ....................... | 711/137 |
| 5,940,848 | 8/1999 | Bains .................................. | 365/193 X |
| 5,983,325 | 11/1999 | Lewchuk ............................. | 711/154 X |

OTHER PUBLICATIONS

IBM TDB; Central Processing Unit Lookahead Logic for Video Memory; Jun 1, 1993, vol. 36, No. 6B; pp. 45–46.

*Primary Examiner*—David L. Robertson
*Attorney, Agent, or Firm*—Rabin & Champagne, P.C.

[57] ABSTRACT

Dynamic random access memory page management is implemented for managing access to row address strobe pages by looking ahead to a next task in determining whether to open or close a memory page after an initial access.

22 Claims, 5 Drawing Sheets

MEMORY PAGE MANAGEMENT

CROSS-REFERENCE TO RELATED APPLICATION

This application is related to copending application Ser. No. 08/919,152, filed Aug. 28, 1997, now U.S. Pat. No. 6,006,303 issued Dec. 21, 1999 by the present inventors entitled "PRIORITY ENCODING AND DECODING FOR MEMORY ARCHITECTURES" attorney docket number OAP-102, the subject matter of which is hereby incorporated by reference.

BACKGROUND OF THE INVENTION

1. Field of the Invention

The invention relates to memory management, and in particular to a hardware apparatus (memory managing IC) and method for managing access of RAS (Row Address Strobe) memory pages by looking ahead to the next task (next device accessing memory) in determining whether to open or close the RAS memory page after the initial access

2. Background Information

There are many patents in the field of memory management. For example, Olson et al., U.S. Pat. No. 4,933,910 "METHOD FOR IMPROVING THE PAGE HIT RATIO OF A PAGE MODE MAIN MEMORY SYSTEM" relates to a method wherein a row address strobe signal is maintained active during an idle cycle so that if a page hit is detected on a subsequent memory cycle, all that is needed to read or write to memory is a column address strobe signal which can be provided via a page mode access (see Abstract, for example). However, this patent does not apparently take into account any considerations to save cycles based on a page miss. This may be shown to be very expensive time-wise since the probability of a page miss, considering context switches, cache misses and drivers, such as used with direct draw, is much greater than 50% as seen by a DRAM controller with a system implementing an L1 and L2 cache, for example.

Pawlowski et al., U.S. Pat. No. 5,301,299 "OPTIMIZED WRITE PROTOCOL FOR MEMORY ACCESS UTILIZING ROW AND COLUMN STROBES" relates to a method for fast page mode accessing of memory. A RAS line, once activated, remains activated even if the bus is idle in anticipation of a DRAM page hit from a subsequent access—the RAS line is held active only if another access is pending and the access is a hit to the same DRAM page as the immediately previous access (see col. 2, lines 1 to 10, for example). While this patent seems to emphasize the importance of optimizing performance for page misses, it only provides performance enhancements for page misses if there is a latency between back-to-back accesses, assuming that if there is no access after completion of the current access, then there will be a page miss. This patent system would apparently experience full setup delays in the case where there are multiple bus masters, a first bus master is currently accessing an open page, and immediately following, another bus master is granted access to a different page. The probability of this happening is high, and increases with the number of bus masters. In another scenario, after a first bus master has accessed an open page, a latency of multiple clocks occurs, followed by a request from another bus master to open the same page, which however, would have already been closed. This can occur with shared buffering and semaphores between two bus masters.

Kametani (1), U.S. Pat. No. 5,335,336 "MEMORY DEVICE HAVING REFRESH MODE RETURNING PREVIOUS PAGE ADDRESS FOR RESUMED PAGE MODE" and Kametani (2), U.S. Pat. No. 5,479,635 "MEMORY DEVICE INCLUDING DRAMS FOR HIGH-SPEED ACCESSING" relate to DRAM organized by page, divided into groups. Means is provided to store an old page address designated at least one access earlier, and for judging whether or not a new page address coincides with the old page address (see Abstract, for example). These patents are apparently specific to page mode, static column mode and nibble mode DRAMs. In addition, they could not apparently be applied to an external memory controller with, for example, X86/Pentium or Pentium-Pro processors, unless both DRAM banks are mapped within the same address space region, since separate memory regions are required for instructions and data access. With most processors, the type of access (instruction or data) cannot always be detected, and although regional in memory, no knowledge of the type of access being performed is defined unless the region is defined within the memory controller. Therefore, the interface must be implemented with a processor that separates the memory map into instruction fetches and data fetches, and defines this as such with some cycles status output.

Goodwin et al. U.S. Pat. No. 5,371,870 "STREAM BUFFER MEMORY HAVING A MULTIPLE-ENTRY ADDRESS HISTORY BUFFER FOR DETECTING SEQUENTIAL READS TO INITIATE PREFETCHING" provides a bank of FIFOs in a memory controller to hold sequential read data for a number of data streams being fetched by a computer. The system detects sequential addresses as a stream, fetches data from DRAM for addresses in sequence, and stores the prefetched data in one of the FIFOs (see Abstract).

Bland et al. U.S. Pat. No. 5,034,917 "COMPUTER SYSTEM INCLUDING A PAGE MODE MEMORY WITH DECREASED ACCESS TIME AND METHOD OF OPERATION THEREOF" relates to a computer system in which memory access time is substantially reduced. After row address strobe (RAS) and column address strobe (CAS) signals are used to select a particular address in a memory during a first memory cycle, the addressed data is latched for later transfer to a data bus. A CAS pre-charge of the memory is then conducted after such latching and prior to the end of the first memory cycle before the commencement of the second memory cycle.

Wicklund et al. U.S. Pat. No. 5,159,676 "SEMI-SMART DRAM CONTROLLER IC TO PROVIDE A PSEUDO-CACHE MODE OF OPERATION USING STANDARD PAGE MODE DRAWS" relates to a DRAM controller which uses logic to selectively enable or disable a page mode of operation as a result of specific instructions from executing software, or upon some prediction of page mode efficiency based on past performance. An address multiplexor generates separate row and column addresses from the CPU address control lines, and to generate the necessary signals to control the timing of the RAS and CAS control signals that operate the DRAM. Page mode is automatically turned on or off based on a prediction of whether or not the next access will be at the same DRAM row address as the last one.

Mayer et al. U.S. Pat. No. 5,303,364 "PAGED MEMORY CONTROLLER" relates to a computer system having a processor coupled to a cache controller, uses page mode memory devices and performs page hit detection on the processor local bus. Column address and data values are latched by a memory controller on memory write operations to allow early completion of the cycle so that the next cycle can partially overlap. This allows the use of economical memories while having a zero wait state page hit operation.

Adams U.S. Pat. No. 5,357,606 "ROW INTERLEAVED FRAME BUFFER" relates to a frame buffer operating in fast page access mode with improved performance for operations such as scrolling and moving which typically access different display memory rows. The system utilizes a row/bank interleaved scheme of multiple display memory banks in the frame buffer such that each display memory bank supports a different set of non-contiguous display rows thus increasing the odds of display memory access in-page hits and decreasing the odds of display memory access in-page misses.

Goodwin et al. U.S. Pat. No. 5,388,247 "HISTORY BUFFER CONTROL TO REDUCE UNNECESSARY ALLOCATIONS IN A MEMORY STREAM BUFFER" relates to a read buffering system employing a bank of FIFOs to hold sequential read data for a number of data streams being fetched by a computer. The FIFOs are located in the memory controller, so the system bus is not used in memory accesses used to fill the stream buffer. The system stores addresses used for read requests made by a CPU, and if a next sequential address is then detected in a subsequent read request, this is designated to be a stream (i.e., sequential reads). When a stream is detected, data is fetched from DRAM memory for addresses following the sequential address, and this prefetched data is stored in one of the FIFOs. The system also prevents the unnecessary prefetching of data by preventing certain CPU requests from being used to detect streams. A FIFO is selected using a least-recently-used algorithm. When the CPU subsequently makes a read request for data in a FIFO, this data can be returned without making a memory access. By taking advantage of page mode, access to the DRAM memory for the prefetch operations can be transparent to the CPU, resulting in substantial performance improvement if sequential accesses are frequent. The data is stored in the DRAMs with ECC check bits, and error detection and correction (EDC) is performed on the read data downstream of the stream buffer, so the stream buffer is protected by EDC.

Lin et al. U.S. Pat. No. 5,440,713 "M-WAY N-PORT PAGED-INTERLEAVED MEMORY SYSTEM" relates to a memory access system suitable for use in a computer system having M memory banks and N masters. The memory access system comprises a separate paged interleaved controller associated with each of the M memory banks. Each of the paged interleaved controllers comprises a bank arbiter and a bank controller. The bank arbiter associated with each memory bank receives requests from the N masters and subjects them to a request-halt protocol. The request-halt protocol executed by each arbiter prioritizes among a plurality of current requests by the masters for the same memory bank. Each arbiter insures that a current request generated by a master will not be granted if the master has a previous request that has not been granted by another arbiter. This insures that the requests of each master are granted in the order in which the requests are made. The request-halt protocol gives a higher priority to current requests specifying a row address which is the same as a valid row address of the previous memory request granted by the arbiter. The request-halt protocol prioritizes among current requests if there is no valid row address of a previous request or if no current address specifies a row address which is the same as the valid row address of the previously granted request.

Tatosian et al. U.S. Pat. No. 5,461,718 "SYSTEM FOR SEQUENTIAL READ OF MEMORY STREAM BUFFER DETECTING PAGE MODE CYCLES AVAILABILITY FETCHING DATA INTO SELECTED FIFO, AND SENDING DATA WITHOUT ACCESSING MEMORY" relates to a read buffering system (like Goodwin et al. above) employing a bank of FIFOs to hold sequential read data for a number of data streams being fetched by a computer. The FIFOs are located in the memory controller, so the system bus is not used in the memory accessed needed to fill the stream buffer. The buffer system stores addresses used for read requests made by a CPU, and if a next sequential address is then detected in a subsequent read request, this is designated to be a stream (i.e., sequential reads). When a stream is detected, data is fetched from DRAM memory for addresses following the sequential address, and this prefetched data is stored in one of the FIFOs. A FIFO is selected using a least-recently-used algorithm. When the CPU subsequently masks a read request for data in a FIFO, this data can be returned without making a memory access, and so the access time seen by the CPU is shorter. By taking advantage of page mode, access to the DRAM memory for the prefetch operations can be transparent to the CPU, resulting in substantial performance improvement if sequential addresses are frequent. One feature is appending page mode read cycles to a normal read, in order to fill the FIFO. The data is stored in the DRAMs with ECC check bits, and error detection and correction (EDC) is performed on the read data downstream of the stream buffer, so the data in the stream buffer is protected by EDC.

Murdoch et al. U.S. Pat. No. 5,572,692 "MEMORY CONFIGURATION DECODING SYSTEM HAVING AUTOMATIC ROW BASE ADDRESS GENERATION MECHANISM FOR VARIABLE MEMORY DEVICES WITH ROW ACCESS INTERLEAVING" relates to a memory configuration system which includes a memory controller comprising a set of memory configuration registers which store information related to memory devices installed in random access memory. The memory configuration registers correspond to one or more rows of memory banks in the random access memory. The memory controller also includes a row size and mask generator coupled to the memory configuration register set and a memory configuration decoder coupled to the row size and a mask generator. The combination of logic within the row size and mask generator and the memory configuration decoder is used to generate a base address for each row of memory locations within the random access memory. The present invention automatically reconfigures the memory array to define the most populous row as Row 0 regardless of where the largest row is physically populated. The reconfiguration of the memory array is the logical to physical mapping feature provided by the system. The system also provides a default memory configuration means (i.e., default ordering of rows) for performing the logical to physical mapping in a predictable manner when two or more rows are populated with equal amounts of memory.

Kocis et al. U.S. Pat. No. 5,485,589 "PREDICTIVE ADDRESSING ARCHITECTURE" relates to a computer system where memory access is accelerated by automatically incrementing the address at the memory chip inputs, as soon as the minimum hold time has occurred. If the next address actually requested by the CPU does not match this predicted address, then the actual address is driven onto the chip inputs as usual, so essentially no time is lost. However, if the automatically incremented address does match the next actually requested address, then a significant fraction of the chip's required access time has been saved.

Fitch U.S. Pat. No. 5,493,666 "MEMORY ARCHITECTURE USING PAGE MODE WRITES AND SINGLE LEVEL WRITE BUFFERING" relates to a memory architecture including a memory cache which uses a single level of write buffering in combination with page mode writes to attain zero wait state operation for most memory accesses by a microprocessor. By the use of such a memory architecture, the speed advantages of more expensive buffering schemes, such as FIFO buffering, are obtained using less complex designs. The memory architecture utilizes same page detection logic and latching circuitry and takes advantage of a feature built into industry standard dynamic RAMs, namely page mode writes, to perform writes to memory which allows the processor to be freed before the write is completed for the most frequently occurring type of write operations.

Goodwin et al. U.S. Pat. No. 5,586,294 "METHOD FOR INCREASED PERFORMANCE FROM A MEMORY STREAM BUFFER BY ELIMINATING READ-MODIFY-WRITE STREAMS FROM HISTORY BUFFER" relates to a read buffering system employing FIFOs to hold sequential read data for a number of data streams being fetched by a computer. When a system sees a read command from the CPU, it stores an incremented value of the address of the read command in a history buffer and marks the entry as valid. The system detects a stream when a subsequent read command specifies an address that matches the address value stored in the history buffer. Upon detecting a stream, the system fetches data from DRAMs at addresses that follow the address of the subsequent read command, and stores it in a FIFO. To reduce unnecessary prefetching, the system looks for a read X, write X, read X+1 (where X and X+1 designate addresses) series of commands to prevent them from creating a stream. This succession occurs often and qualifies as a stream, but is seldom followed by other reads that maintain the stream. The system checks for this series by comparing a incremented value of the address of the write commands with each valid address value stored in the history buffer. A match causes the system to invalidate the history buffer entry containing the matched address value. This effectively disables the use of this address value for detecting a stream upon subsequent read commands and, consequently, for prefetching data from memory.

In prior systems, such as some of those described above, if an error is made in keeping a page open, that is, a next device/task memory miss (closed page hit), there is a performance penalty over simply closing the open page after access by a first device. A need exists for optimizing performances of page misses. Therefore, there exists a need for a more accurate determination of the next task's target page.

SUMMARY OF THE INVENTION

It is, therefore, a principle object of this invention to provide a memory management method and apparatus.

It is another object of the invention to provide a memory management method and apparatus that solves the above mentioned problems.

It is another object of the invention to provide a memory management method and apparatus that solves the above mentioned problems.

These and other objects of the present invention are accomplished by the memory management method and apparatus disclosed herein.

In particular, in order to overcome the deficiencies of the prior designs and methods, the present invention provides a hardware memory managing IC and method for managing access of RAS (Row Address Strobe) memory pages by looking ahead to the next task (next device accessing memory) in determining whether to open or close the RAS memory page after the initial access. The invention implements a two-stage memory pipeline where stage 1 is priority encoding, decoding and arbitration, and stage 2 is control of specific DRAM function and timing signals (memory controllers).

In the memory arbitration, device memory requests are prioritized by an arbitrator function. The highest priority device is given access to memory by the memory controller, that is, the memory controller looks ahead to next highest device to determine whether to keep the current open page OPEN, or close it, for the next device, based on the row address boundary of the target page.

Advantageously, if the page is kept open, no page setup time delays are required. For example, for EDO RAM, there is no RAS pre-charge, row address setup, and RAS assertion delay times, while for synchronous DRAM, there is no pre-charge, activate command and CAS (column address strobe) latency times.

One object of invention is to determine when to close a page to minimize the performance penalty for a miss; and to enable back-to-back tasks to access the same open page thereby avoiding closing and reopening page penalties, i.e., eliminate pre-charge, row and column address setup/hold delays, and RAS and CAS delays.

These and other objects, advantages and features of the invention will become apparent from the detailed description below taken with the drawings.

DETAILED DESCRIPTION OF THE PREFERRED EMBODIMENTS

The invention will now be described in more detail by way of example with reference to the embodiments shown in the accompanying Figs. It should be kept in mind that the following described embodiments are only presented by way of example and should not be construed as limiting the inventive concept to any particular physical configuration.

A target environment for the invention is, for example, a PC (personal computer) with a Unified Memory Architecture (UMA) having extended data output (EDO) DRAMs. It is assumed that the reader is familiar with the internal workings of EDO DRAM and SDRAM devices. Readers may refer to any specification of an EDO DRAM, SDRAM and SIMM/DIMM module specifications implementing EDO DRAM or SDRAM devices.

Figure 1:
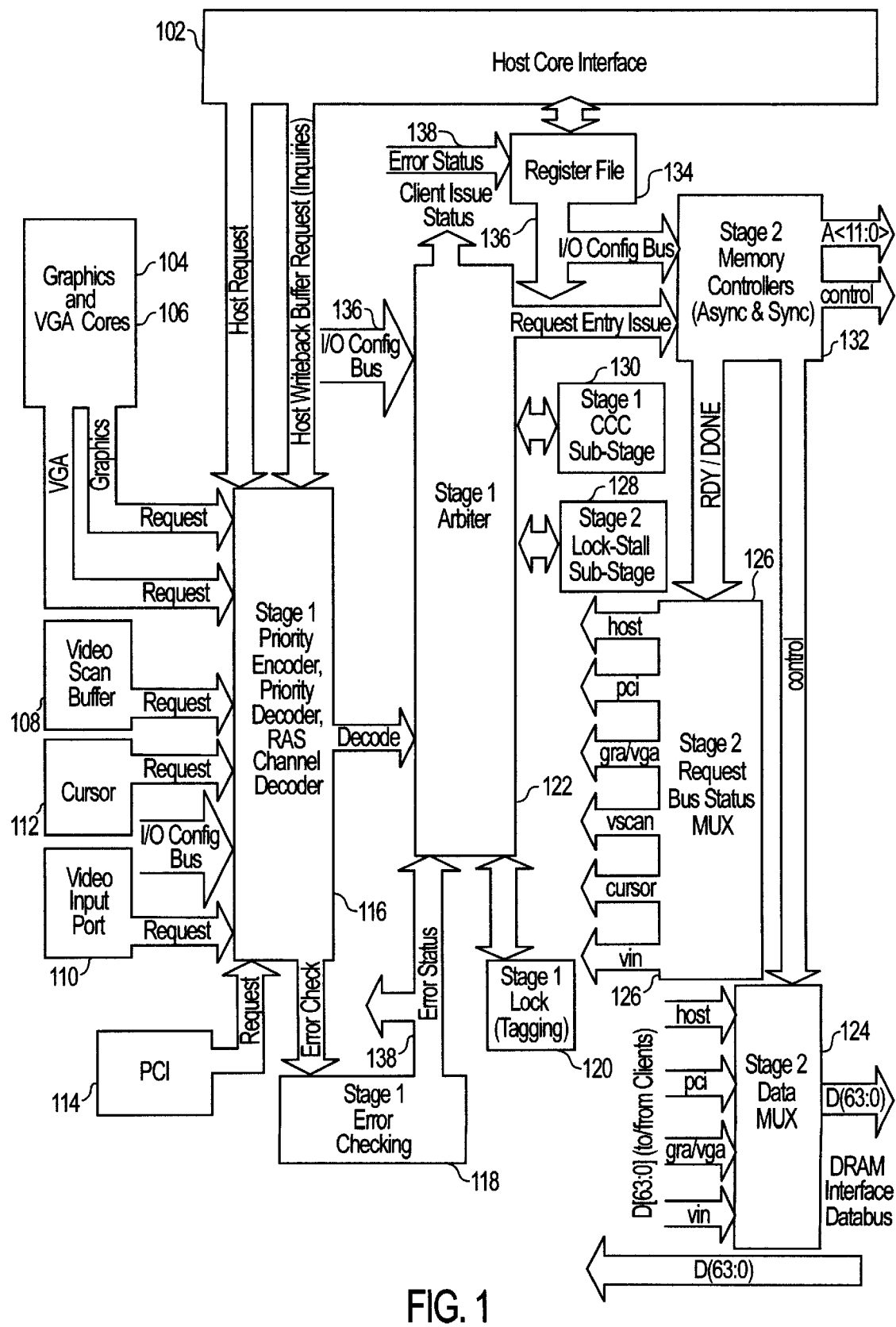
FIG. 1 is a block diagram of a memory core according to an exemplary embodiment of the invention.

FIG. 1 is a block diagram of a memory core implemented according to an exemplary embodiment of the present invention.

As viewed by the memory core, there are seven agents— in this example, all agents are called clients since the memory core is serving all requests to access a single memory resource. An example of a client might be a host CPU 102 such as an X86 microprocessor that requires separate read and write paths, a graphics controller 104, a VGA controller 106, a video scan buffer 108 accessing memory for display refresh, a real-time-YUV-multimedia port 110 (video input), a hardware cursor 112 or separate bit mapped image, or an I/O client, such as PCI 114.

The Stage 1 Priority Encoder, Priority Decoder, and RAS Channel Decoder is illustrated as block 116 in FIG. 1. It receives requests as shown from the various clients. Block 116 outputs an Error Check to Stage 1 Error Checking block 118, and a Decode to Stage 1 Arbiter 122.

Stage 1 Error Checking block 118 outputs Error Status to Stage 1 Arbiter block 122 and Register File block 134.

Stage 1 Lock (Tagging) block 120 exchanges signals with the Arbiter block 122, as do Stage 1 CCC Sub-stage block 130 and Stage 1 Lock-Stall Sub-stage block 128.

Arbiter block 122 is coupled to an I/O Config Bus.

Arbiter block 122 outputs Request Entry Issue to the Stage 2 Memory Controllers (Async & Sync) block 132.

Arbiter block 122 outputs Client Issue Status.

Stage 2 Memory Controllers block 132 outputs Control signals to Stage 2 Data MUX 124, which is coupled to the respective data busses of the clients, and to the DRAM Interface Databus.

Stage 2 Memory Controllers block 132 outputs RDY/DONE to the Stage 2 Request Bus Status MUX block 126, which in turn provides an output to each of the respective clients.

Stage 2 Memory Controllers block 132 is further coupled to the Register File block 134, the Arbiter block 122, and the Priority Encoder/Decoder/RAS Channel Decoder clock 116, by the I/O Config Bus.

The Register File block 134 is coupled to the Host Core Interface block 102.

In more detail, all memory clients interface to stage 1 of the memory core via a request bus. Illustrated clients include host core interface 102, graphics accelerator engine 104, VGA video controller 106, video-scan buffer 108, hardware cursor 112, YUV video input stream 110, and PCI core 114.

The request bus for each client provides for signaling a request by a client with a corresponding physical address, byte masks, burst size, type (read or write), burst order (linear, sequential, interleaved), read modify (lock the location(s) requested), sequence number and write data inputs. The request bus output signals from the memory core to the client include an issue indicator, error, read and write data ready, sequence number issued or ready and read data.

Respective clients may or may not support write or read buffering, based on latency sensitivity and burst size. Clients also are programmed with a separate register determining regions of memory deemed as cacheable which require cache coherency (snooping or inquire cycles) by the memory core. Sideband signals are provided between the host and stage 1 in order to perform synchronization of inquire (snoop) cycles, with the potential result being a cache invalidate if a requested memory location hits a modified cache line. Cache invalidations result in a writeback of the cache line which must be performed before the requesting client's access. Specifically, for memory core to host interface these sideband signals are: inquire cycle request and inquire address; and for host interface to memory core, they are inquire cycle acknowledge, hit modified, and not hit modified.

The I/O config bus 136, provides all programmable register file 134 outputs in parallel, such as arbitration related registers determining priority regions and rate of priority change, cacheable memory regions, memory protection regions, memory timing, memory types, RAS channel size regions, and interleave configurations between two memory RAS channels. All data is stored in register file 134.

Stage 1 priority encoder/decoder RAS channel decoder block 116 includes hierarchical operational blocks for performing priority encoding, priority decoding, and RAS channel (address) decoding. The priority encoder performs the priority count accumulation function as described herein, where a pending client request accumulates a priority count value based on register setups describing the rate of change of the priority count for 0 of 2 priority regions. The priority encoder also signals preemption requests for pending clients based on the rules outlined for priority regions 0 through 2 for generating preemption for a given client.

The priority decoder compares all priority counts for pending client requests and indicates a winning client ID based on priority region rules for regions 0 through 2. In addition, the priority decoder indicates a preempt of an active stage 2 task based on preemption requests by the priority encoder, and rules for the 3 priority regions.

In parallel with the priority encoder and decoder of block 116, the RAS channel decoder (controller) asserts a RAS channel decode, for each of the pending client requests, based on the starting request address decode along with the configuration of the specific memory controller RAS channels as they relate to the memory map.

The stage 1 arbiter 122, in parallel with and based on determination of all hierarchical blocks of 116, latches a winning request after completion of a task by an active stage 2 memory controller 132. The latched request includes the request address type, burst size, byte masks, client ID and RAS channel decode signals. The latched signals are issued to the stage 2 memory controllers 132.

If a preemption occurs, the arbiter 122 stores the preempted task in a buffer along with the current outstanding burst size, and then issues the preempting task. Upon completion of the preempting task, the arbiter 122 restores the preempted task with a new base (address) and the outstanding burst size. Nested preemptions are supported. However, in the event of multiply preempted tasks, a task is restored based on its priority count after completion of the preempting task. Upon latching of any new request, the arbiter block 122 formally issues a request signal to the winning client.

Three substages to the arbiter are supported. The CCC (cache coherency checking) substage 130 is issued requests that require cache coherency checking, and remain in the CCC substage until either a miss or a hit with necessary cache line writebacks occur. The CCC substage is one request deep, and requests an inquire cycle to the host interface via sideband signals. The stage 1 lock (tagging) block 120 tags any read addresses requested as a read-modify-write access indicated on the request bus. Any subsequent requests to this location are stalled and issued to the stage 1 lock-stall substage 128 until a write cycle occurs from the locking client to the locked location.

The stage 1 error checking block 118 provides checking of requests to illegal, protected (including read only), and unmapped addresses. An error status bus 138 is mapped to the register file block 134 for reading of error status under software control, in addition to providing an error signal asserted to the offending client.

Stage 2 in this exemplary embodiment is comprised of two memory controllers 132, an asynchronous and a synchronous controller. The asynchronous controller, for this application, drives EDO DRAMs, while the synchronous controller drives SDRAMs/SGRAMs. Each controller has two channels, A and B, that may be interleaved for increased performance. The output of the controllers 132 are multiplexed driving the necessary DRAM control signals and address. Ready and done signals are generated for handshaking of data between the active client and the target memory controller, multiplexed by stage 2 request bus status MUX block 126 to the appropriate client. This block 126 de-asserts the ready and done signals to clients that are idle or have requests pending.

Read data is provided directly from the DRAM interface data bus to all clients, with each respective client receiving its own read ready and done signals to indicate when read data is valid. Each writeable client has its own write-data bus and is multiplexed by data MUX block 124 based on the active client, and controlled by the active memory controller. Write data is signaled as written by a write ready signal asserted by a memory controller along with the done signal.

In more detail, pipeline stage 1 schedules tasks based on priority, stage 2 schedules tasks based on the state of all memory devices (DRAMs) in memory space. Stage 2 determines a lock window defining when a pending task is the winner, the winner being latched and transferred from stage 1 to stage 2.

When accessing a page, an active one of the stage 2 memory controllers looks ahead during CAS timing states to the next target page, based on the winner's address provided by the stage 1 priority encoder, decoder and RAS channel decoder. The next target page is thus based on the address and RAS channel decodes of the next winner. If the lookahead is to the same memory page, or if it is to a different memory page but to the same RAS channel, the active memory controller will take the next request. Otherwise, an idle memory controller will activate on the request.

The next request is accepted based on minimum timing parameters of the target DRAM. For EDO RAMs, this is CAS address hold from CAS (which determines when RAS address can be asserted for a new page to an idle RAS channel), or RAS deassertion when the new task hits a new page to the same RAS channel. These timing parameters determine when the new task is accepted by the memory controller. The actual winner could change as soon as 1 state before this decision—the task is accepted 1 state before the timing parameters above are satisfied.

For SDRAMs, the determination of whether to close or keep open a memory page is made upon assertion of a read or a write command to an internal SDRAM bank, e.g., a read command versus a read command with auto-pre-charge. The lock-window occurs 1 state before the read or write command will be issued for the current task. The current task and the next task determine whether the page remains open or is closed. A command with auto-pre-charge or manual pre-charge is generated based on whether the current task and next task are aligned on the same page or a different page, respectively.

As already noted, the invention relates to a method of managing open and closed pages within a memory controller supporting DRAM devices such as Extended Data Output (EDO) DRAMs and Synchronous DRAMs (SDRAMs). The memory controller supports the arbitration of multiple agents (bus master devices supporting direct memory access or DMA) sharing a common memory resource(s) including the DRAM's control, address and data pins. The invention is targeted and implemented within one large application specific integrated circuit (ASIC) device functioning as the core-logic component for a personal computer (PC) supporting Unified Memory Architecture (UMA) However, this invention may apply to any hardware architecture requiring access to one or more shared memory paths or channels, and is not limited to UMA alone.

Core-logic components deal with interfacing a central-processing-unit (CPU) device's local-control and data busses to other busses such as direct-memory-access RAM (DRAM) and I/O busses such as peripheral component interconnect (PCI). A common requirement with core-logic devices implemented across different CPU architectures, is to allow multiple agents to access a shared resource such as DRAM and PCI.

Multiple tasks or requests from all agents are prioritized by an arbiter, with one task winning the right to access the memory resource at a time. A winning client who has the highest priority, has its task issued to the memory controller—the memory controller looks ahead to the second highest priority client, just after the issue of the first task, to base the control of the target page bounded by a unique ROW address. The control decision is whether to close the target page, or to have it remain open for the task to follow.

Keeping a page open, if the task to follow will hit the open page, has performance advantages since a DRAMs page setup is not required for hits to an open page—for an EDO DRAM, Row Address Strobe (RAS) Pre-charge, ROW Address setup to RAS and RAS assertion delay times can be eliminated for systems supporting multiple RAS signals to a double sided memory SIM (Single in-line Memory Module) or a pair of DIMMs (Dual in-line Memory Modules)—for synchronous DRAM, pre-charge, activate command and column address strobe (CAS) latency times can be eliminated.

Keeping a page open for a new task hitting another page creates a performance penalty over closing the page to begin with in the area of pre-charge times. This is the main concentration of this invention—to determine when to close a page in order minimize the delay, due to pre-charge time, seen by a task hitting closed pages. In addition, this invention provides a method by which back to back tasks may access open pages, eliminating not only pre-charge, but ROW and Column address setup/hold delays, and RAS to (CAS) delay timings.

Referring to FIG. 1 again, a block diagram of a sample implementation is outlined. As viewed by the memory core, there are seven agents—in this example, all agents are called clients since the memory core is serving all requests to access a single memory resource. An example of clients might be a host CPU such as an X86 microprocessor that requires separate read and write paths, a graphics controller, a VGA controller, a video scan buffer accessing memory for display refresh, a real-time-YUV-multimedia port (video input), a hardware cursor or separate bit mapped image, and an I/O client such as PCI.

In this example, all clients access one memory resource making this implementation a unified memory architecture (UMA). The goals of this architecture is to provide a predictable maximum latency path to memory, to minimize the BW usage of each client caused by the opening and closing of memory pages, and to maximize the burst throughput for each client to the memory devices by supporting both interleaving and the management of keeping pages open and closed, as will be discussed in this disclosure.

The arbitration and priority scheme for this block diagram is outlined in the copending application referenced above, "Priority Encoding and Decoding for Memory Architectures," and therefore will not be discussed in detail in this disclosure. This disclosure concentrates on the management of tasks between the arbiter, the asynchronous memory controller (AMC) and the synchronous memory controllers (SMC), with the AMC controlling EDO DRAM, and the SMC controlling SDRAM.

Figure 2:
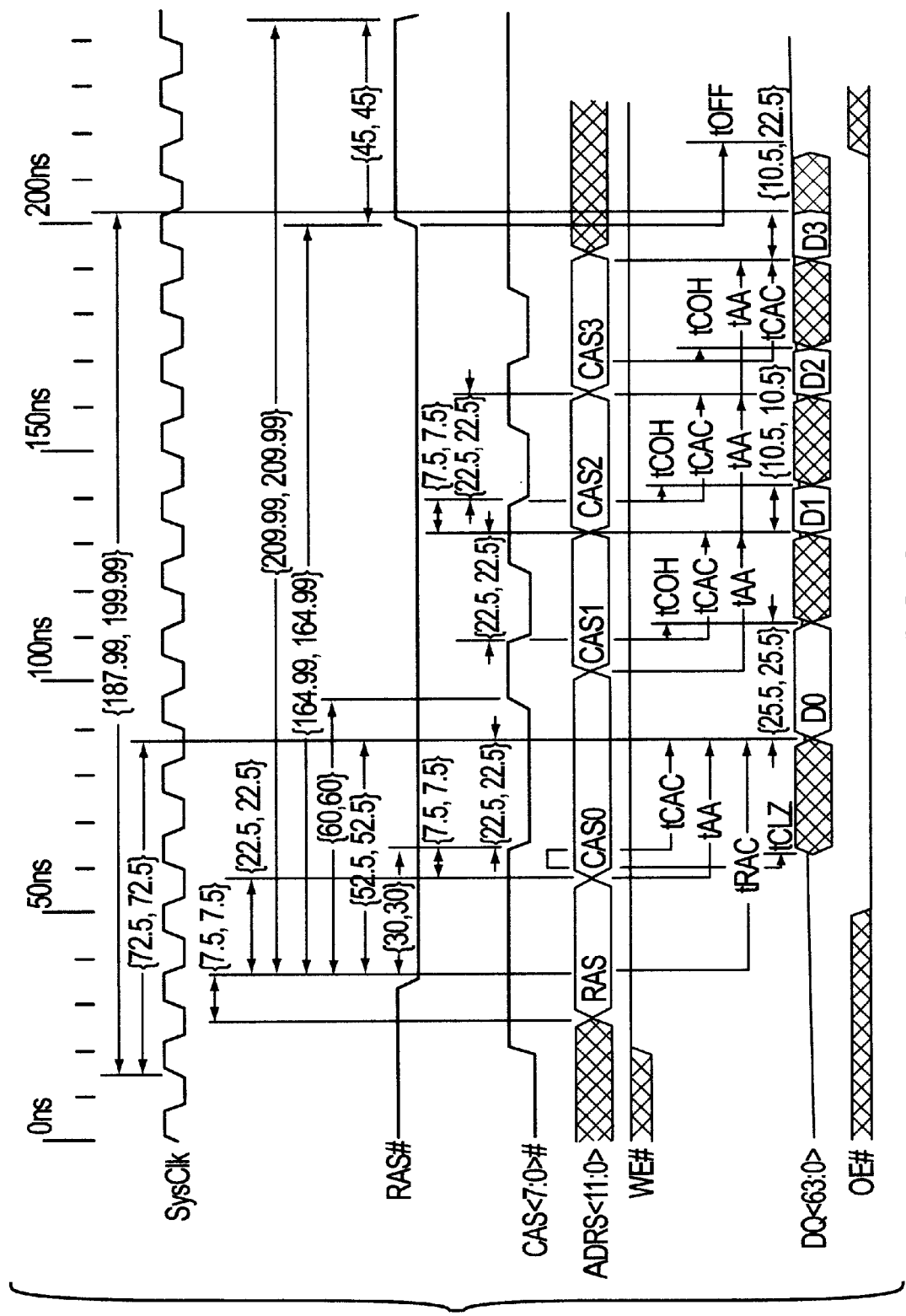
FIG. 2 is an EDO DRAM timing diagram.
Figure 3:
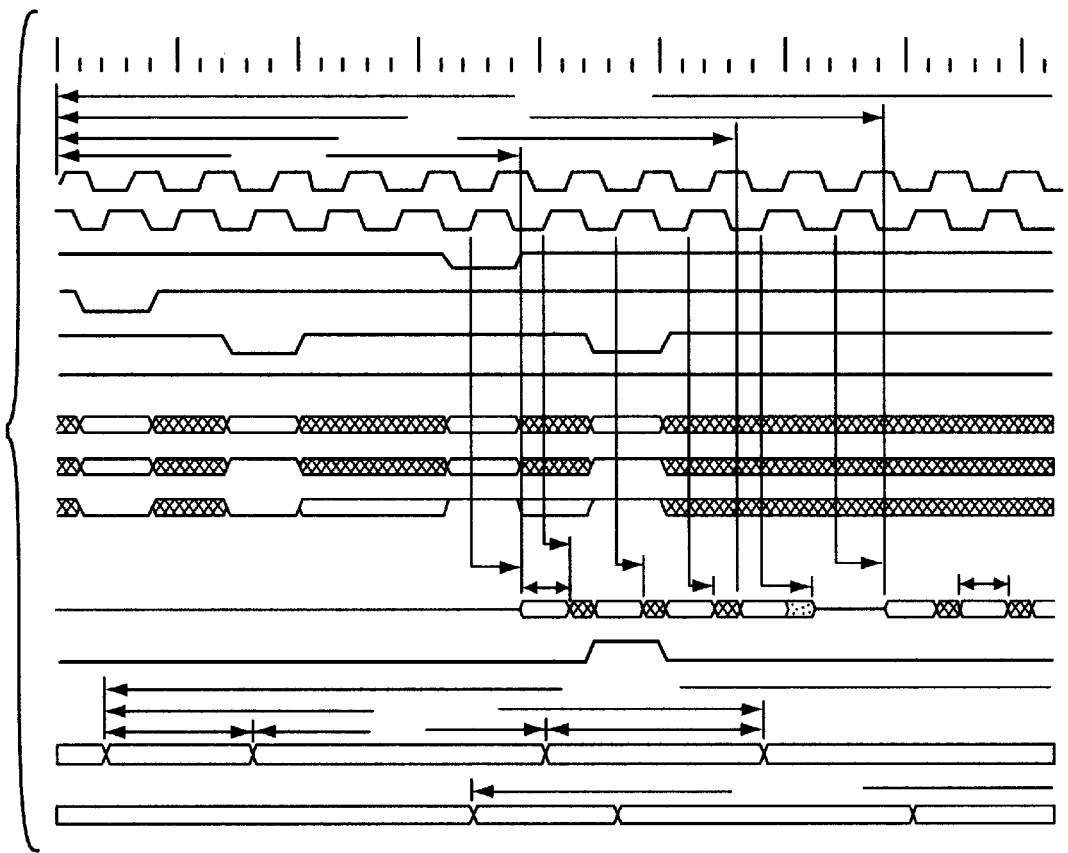
FIG. 3 illustrates an SDRAM timing typical read diagram according to an exemplary embodiment of the invention.

FIG. 2 illustrates a typical timing diagram for an EDO DRAM (Read cycle illustrated), and FIG. 3 illustrates a typical timing diagram for a SDRAM (Read Cycle illustrated). Common to both DRAM architectures is the requirement of RAS pre-charge, varying from 2 to 3 bus clocks for this application, based on a 15ns bus clock period.

For EDO DRAMs, pre-charge requires RAS to be deasserted high for Trp (Time for RAS pre-charge). Assuming an interleave architecture, as outlined in FIG. 4, a memory controller can eliminate the RAS-pre-charge-delay time by sharing the address bus between RAS and CAS, and positioning the asserting edge of RAS for the new task, with the deasserting edge of RAS from the previous task for different bank accesses. This design assumes that the two RAS banks are interleaved on 4 Kbyte page boundaries.

Figure 4:
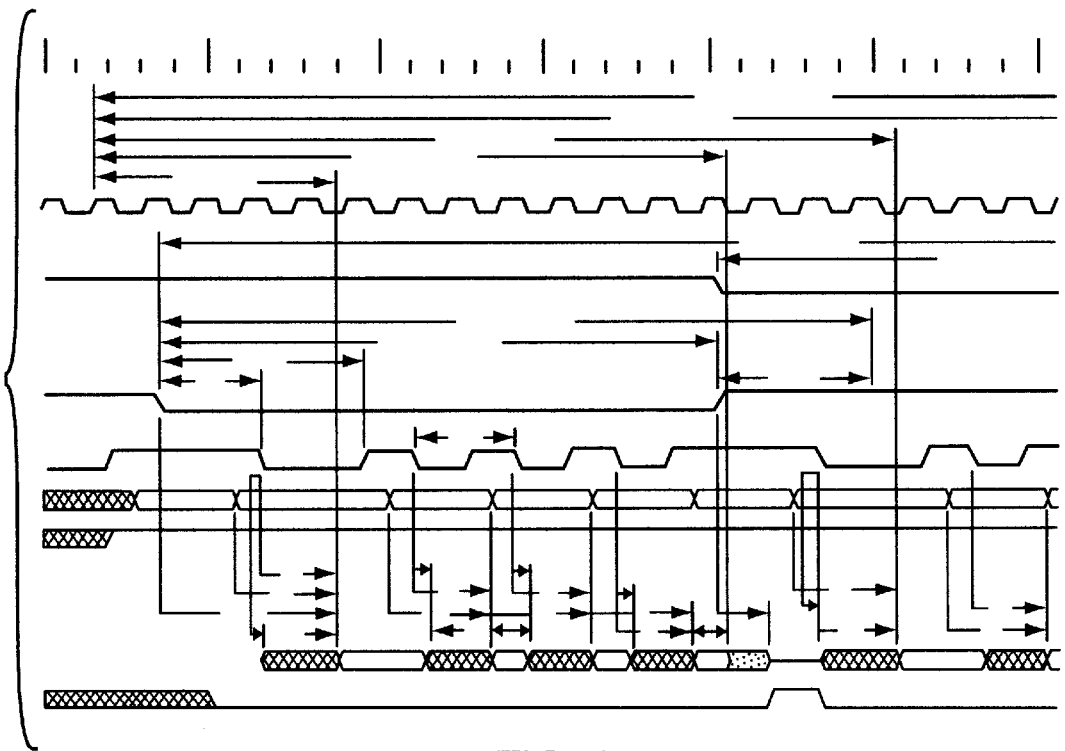
FIG. 4 illustrates an EDO DRAM timing diagram demonstrating interleave according to an exemplary embodiment of the invention.

Referring to FIG. 4, the invention takes advantage of looking ahead to the next task pending, then determining whether to assert row address setup to RASI# (new task is hitting a closed page to the idle RAS) or to keep RAS0# asserted (open page). This diagram illustrates a 1 clock savings—not a large impact. This is due to the fact that EDO DRAMs require manual pre-charge.

Figure 5:
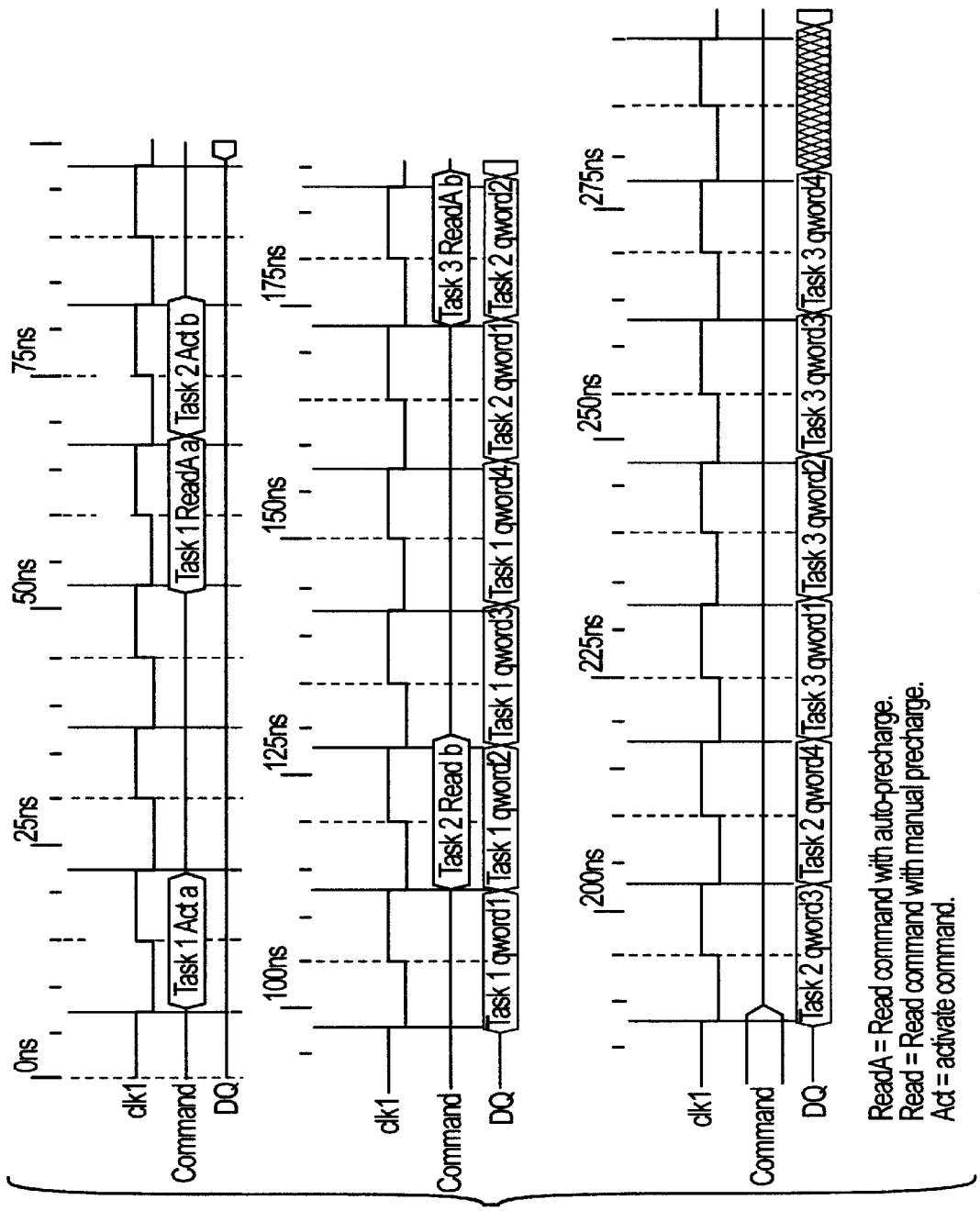
FIG. 5 illustrates an SDRAM command sequence according to an exemplary embodiment of the invention.

The same procedure, when applied to SDRAMs, has a much greater impact to performance since SDRAMs support both manual-and-auto-pre-charge, and the ideal goal for SDRAM throughput is to burst data on every bus clock. SDRAMs support an internal interleave scheme similar to what was outlined for the EDO DRAM in FIG. 4, in order to achieve transferring data on every clock cycle. The problem that exists with SDRAMs is that a decision must be made as to auto-pre-charge the bank after burst completion when the read-or-write command (equivalent to CAS, assertion for EDO DRAMs) is issued. FIG. 5 illustrates the timing of command execution for an SDRAM device.

For better performance in both burst and latency, SDRAMs essentially require a memory controller to decide whether to close or keep open a target page before opening the page to begin with. This decision has critical performance impacts if the decision to keep the page open or closed after burst access is incorrect.

If a page remains open by a memory controller asserting a read-or-write command with no auto-pre-charge for the current task, a performance penalty will occur for the following task if it hits another page to the same internal bank. This performance hit can be as much as 3 clocks for the 15 ns bus clock example, due to performing a manual pre-charge command followed by waiting the Trp (Time for RAS pre-charge) parameter time if the access is to the same internal bank. The other problem occurs when the page is closed by a memory controller by asserting a read-or-write command with auto-pre-charge for the current task. If the following task hits the same page, a greater performance hit is experienced by the client, due to the 3 clocks for pre-charge as outlined above, up to 3 clocks for activate to command delay (Trcd), and up to 3 clocks for CAS latency, potentially stalling the memory pipeline for up to 9 clocks.

The invention tightly couples the priority encoding, decoding and arbitration to gain access to the memory pipeline channel with the memory controller of the SIMMS and DIMMS, as in FIG. 1. A memory pipeline is implemented with the priority encoding, decoding and arbitration performed in stage one and the control of the specific DRAM signals in stage two.

Stage one is concerned with priority count accumulation of pending tasks that includes support for preempting the current task being executed in stage two. Stage two is specifically concerned with the generation of DRAM functional signal inputs and signal timing. Stage one schedules tasks based on priority, while stage two schedules task, based on the state of all DRAMs within the memory map.

The tight coupling comes into play on a task-by-task basis. The decision to close or open a page after the current task's execution is determined by the next winning (highest priority) pending task. Stage two determines a lock window—this lock window defines when a pending task is claimed as the winner. The wining task is latched and transferred by stage 1 into stage 2.

Figure 6:
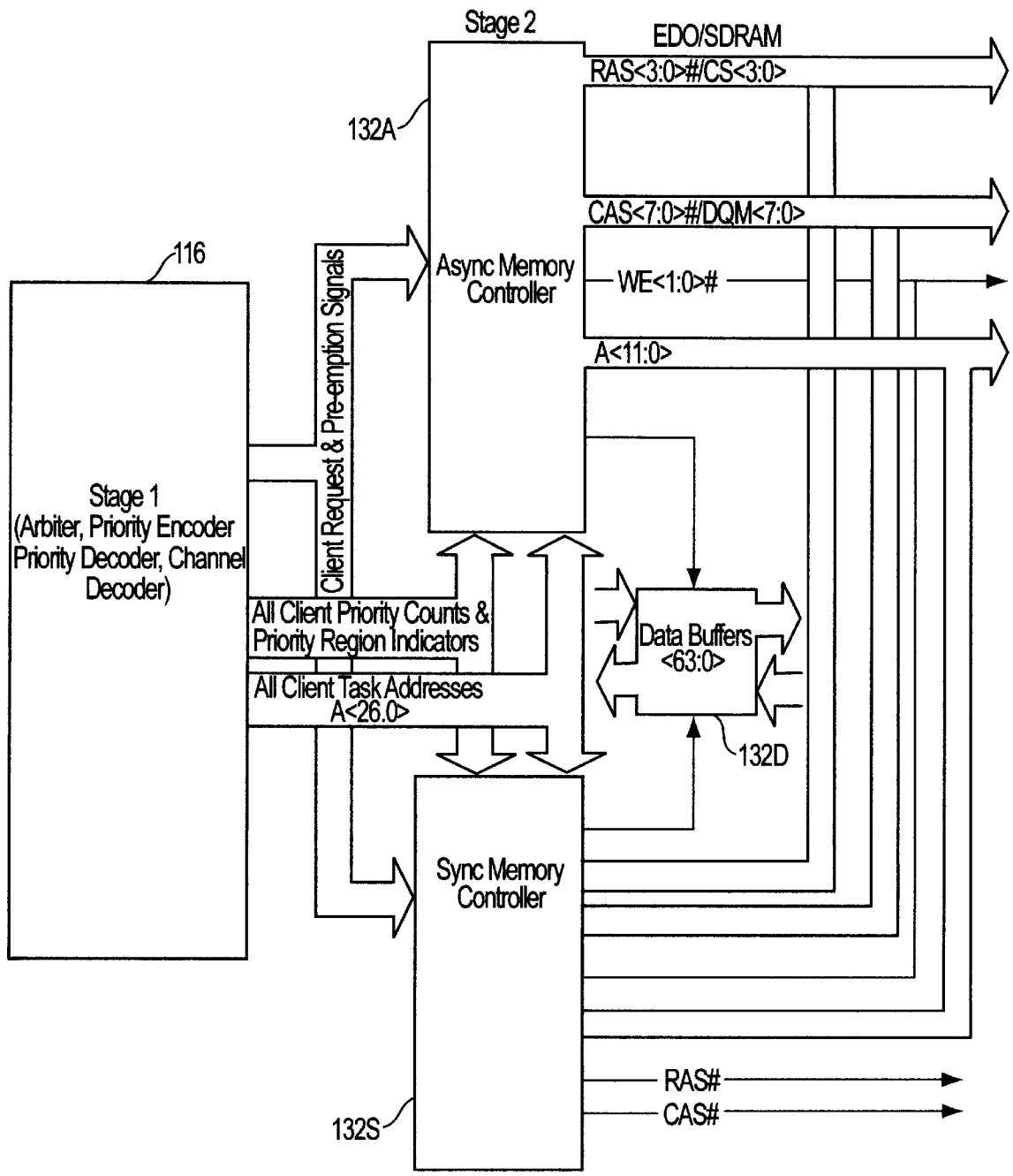
FIG. 6 illustrates a block diagram of asynchronous and synchronous memory controller interfacing according to an exemplary embodiment of the invention.

For the EDO DRAM Implementation, there are two independent state machines, deriving the timing for RAS, CAS, WE and ADRS. FIG. 6 is a block diagram of the design illustrating the interfacing of the two memory controllers to the common DRAM pins. Both state machines can drive any of the RAS channel pins and have knowledge of both the current page under execution, and the next target page to be executed. The target timing of the DRAM signals is per FIG. 4.

For a given memory controller, if it is currently accessing a page, the controller looks ahead during the CAS timing states at the next target page, based on the winning client's address (winning client determined as having the highest priority). This is provided in terms of an address and RAS channel decodes of the next winning client by stage 1's priority encoder, priority decoder and RAS channel address decoder blocks.

The active memory controller will only take the next request if it is directed to the same memory page or to a different memory page to the same RAS channel. Otherwise, the idle memory controller will activate on the next request. Regardless, the winning client is accepted by a memory controller based on achieving the performance allowed by the minimum timing parameters of the target DRAM. For EDO DRAMs, this is CAS address hold from CAS (this determines when RAS address can be asserted for a new page to an idle RAS channel) or RAS deassertion when the new task hits a new page to the same RAS channel (the more traditional approach to starting a new task).

These critical timing parameters determine when the new task is accepted by the memory controller. The actual winning client could change as soon as 1 state before this decision—the client is accepted one state before the timing parameters just mentioned are satisfied.

For SDRAMs, consideration of closing or keeping open a memory page must be made upon asserting a read or write command to an internal SDRAM bank (refer to FIG. 5), for example, a read command versus a read command with auto-pre-charge. The lock window occurs 1 state before the read or write command will be issued for the current task. Like with EDO control, the current task and the next winning task determine whether the page remains open or closed—a command with auto-pre-charge or manual pre-charge is generated based on whether the current task and the next winning task are aligned on the same page or a different page respectively.

A special consideration occurs when a client is gaining an access with a high priority count. For clients that access contiguous memory locations such as a frame buffer, or a YUV video input, if the client experiences latency that places its priority count above a critical threshold, the memory controller assumes that the client will gain access again to the same page (see the previous patent disclosure titled Priority Encoding and Decoding for Memory Architectures where this critical threshold is defined as a client whose priority count is within priority region three).

With this solution for SDRAMs, a page remains open or is closed based on whether the next access will hit the page. This solves the problems outlined in the Problems That Exist section.

The current invention may be implemented within a chip referred to as PUMA (Processor Unified Memory Architecture) which is a core-logic device interfacing a Pentium microprocessor to an L2 cache subsystem, a DRAM (SDRAM and EDO) memory architecture as this document describes, a PCI subsystem, integrated VGA and Graphics Controller, YUV video input port, hardware cursor and video-frame-buffer refresh support.

FIG. 6 shows an exemplary implementation for asynchronous and synchronous memory controllers 132A and 132S, respectively, with data buffers 132D provided.

It will be apparent to one skilled in the art that the manner of making and using the claimed invention has been adequately disclosed in the above-written description of the preferred embodiments taken together with the drawings.

The invention has been described above by way of an exemplary embodiment, however, the scope of the invention is not intended to be limited thereby. As one of ordinary skill in the art would know, the above exemplary embodiment is subject to various modifications and enhancements within the spirit and scope of the invention, which is defined by the appended claims.

What is claimed is:

1. An apparatus for managing access of RAS (Row Address Strobe) memory pages by looking ahead to a next task representing a next device requesting access to memory in determining whether to open or close a RAS memory page after an initial access, comprising:

a two-stage memory pipeline, wherein a first stage comprises a priority encoding and decoding sub-stage and an arbitration sub-stage, and wherein a second stage comprises a memory controller which controls memory functions and timing.

2. The apparatus according to claim 1, wherein the memory comprises extended data output random access memory (EDO RAM), and wherein RAS pre-charge, row address setup, and RAS assertion delay times are avoided due to the looking ahead.

3. The apparatus according to claim 1, wherein the apparatus is for installation into a personal computer having a unified memory architecture with extended data output random access memory.

4. The apparatus according to claim 1, wherein the memory comprises synchronous DRAM, and wherein pre-charge, activate command and CAS (column address strobe) latency times are avoided.

5. The method according to claim 1, wherein the memory comprises synchronous DRAM, and wherein pre-charge, activate command and CAS (column address strobe) latency times are avoided.

6. The apparatus according to claim 1, wherein the apparatus is for installation in a system comprising:

a host microprocessor having separate read and write paths;

a graphics controller;

a VGA controller;

a video scan buffer accessing memory for display refresh;

a real-time-YUV-multimedia port providing video input; and at least one of: a hardware cursor or separate bit mapped image, or an input/output device.

7. The apparatus according to claim 1, wherein the first stage further comprises an error checking sub-stage;

wherein the priority encoding and decoding sub-stage receives requests from a plurality of devices and outputs an error check to the error checking sub-stage, the priority encoding and decoding sub-stage outputting a decode to the arbitration sub-stage;

wherein the error checking sub-stage outputs an error status to the arbitration sub-stage; and wherein the arbitration sub-stage is coupled to an input/output configuration bus, and outputs a request entry signal to the memory controller.

8. The apparatus according to claim 1, further comprising a request bus for each device which provides for signaling a memory request by a device including a corresponding physical address, byte masks, burst size, the memory access type (read or write), the burst order (linear, sequential, or interleaved), read modify (lock the location(s) requested), sequence number and write data inputs;

wherein the request bus further provides for output signals from the memory to a device, the signals including issue indicator, error, read and write data ready, sequence number issued or ready, and read data.

9. The apparatus according to claim 1, wherein the priority encoding and decoding sub-stage further comprises a row address strobe (RAS) channel decoder/controller which asserts a RAS channel decode for each pending device memory request based on a starting request address decode along with a configuration of a specific memory controller RAS channel relative to a memory map.

10. The apparatus according to claim 1, wherein the second stage memory controller comprises two memory controllers including an asynchronous memory controller and a synchronous memory controller.

11. The apparatus according to claim 10, wherein the asynchronous memory controller drives EDO DRAM; and wherein the synchronous memory controller drives SDRAM/SGRAM.

12. The apparatus according to claim 11, wherein each memory controller has two channels that are capable of being interleaved to increase performance.

13. The apparatus according to claim 11, wherein the outputs of the asynchronous memory controller are multiplexed driving DRAM control signals and address signals.

14. The apparatus according to claim 1, wherein the first stage schedules tasks based on priority, and the second stage schedules tasks based on a state of all memory devices in memory space.

15. The apparatus according to claim 1, wherein the second stage determines a lock window defining when a pending task is the winner, the winner being latched and transferred from the first stage to the second stage.

16. The apparatus according to claim 15, wherein the memory controller comprises a plurality of memory controllers;

wherein when accessing a page, an active memory controller looks ahead during CAS timing states to the next target page based on the priority provided by the first stage priority encoder, decoder and RAS channel decoder sub-stage, including address and RAS channel decodes of the next highest priority device; and wherein if the looking ahead is to the same memory page as the currently accessed page, or if the looking ahead is to a different memory page but to the same RAS channel, the active memory controller takes the next memory request;

wherein if the looking ahead is not to the same memory page or the same RAS channel, an idle one of the memory controllers will activate on the next memory request;

wherein the next memory request is accepted based on a minimum timing parameter of the target memory device, wherein for EDO RAM, the minimum timing parameter is one of: CAS address hold from CAS which determines when RAS address can be asserted for a new page to an idle RAS channel, or RAS deassertion when a new task hits a new page to the same RAS channel; and wherein for SDRAM, the determination of whether to close or keep open a memory page is made upon assertion of a read or a write command to an internal SDRAM bank, including a read command versus a read command with auto-pre-charge.

17. The apparatus according to claim 1, wherein the apparatus comprises an application specific integrated circuit device functioning as the core logic component for a personal computer supporting unified memory architecture.

18. A method of managing access of RAS (Row Address Strobe) memory pages by looking ahead to a next task representing a next device requesting access to memory in determining whether to open or close a RAS memory page after an initial access, comprising:

providing a two-stage memory pipeline, wherein a first stage comprises a priority encoding and decoding sub-stage, and an arbitration sub-stage, and wherein a second stage comprises a memory controller which controls memory function and timing;

in the memory priority encoding and decoding sub-stage, prioritizing memory requests to determine at least a highest priority device and a next highest priority device;

in the arbitration sub-stage, arbitrating among the prioritized memory requests; and with the memory controller, giving access to memory to the highest priority request, looking ahead to next highest priority request, and determining whether to keep the current open page open, or close it, for the next highest priority request, wherein the determining is based on a row address boundary of a target page.

19. The method according to claim 18, wherein the memory comprises extended data output random access memory (EDO RAM), and wherein RAS pre-charge, row address setup, and RAS assertion delay times are avoided due to the looking ahead.

20. The method according to claim 18, wherein the first stage further comprises an error checking sub-stage;

wherein the priority encoding and decoding sub-stage receives requests from a plurality of devices and outputs an error check to the error checking sub-stage, the priority encoding and decoding sub-stage outputting a decode to the arbitration sub-stage;

wherein the error checking sub-stage outputs an error status to the arbitration sub-stage; and wherein the arbitration sub-stage is coupled to an input/output configuration bus, and outputs a request entry signal to the memory controller.

21. The method according to claim 18, further comprising a request bus for each device which provides for signaling a memory request by a device including a corresponding physical address, byte masks, burst size, the memory access type (read or write), the burst order (linear, sequential, or interleaved), read modify (lock the location(s) requested), sequence number and write data inputs;

wherein the request bus further provides for output signals from the memory to a device, the signals including issue indicator, error, read and write data ready, sequence number issued or ready, and read data.

22. The method according to claim 18, wherein the priority encoding and decoding sub-stage further comprises a row address strobe (RAS) channel decoder/controller which asserts a RAS channel decode for each pending device memory request based on a starting request address decode along with a configuration of a specific memory controller RAS channel relative to a memory map.

* * * * *